United States Patent [19]

Sauer et al.

[11] 4,146,467
[45] Mar. 27, 1979

[54] APPARATUS FOR DETECTING AND REJECTING DOWNED AND DAMAGED CONTAINERS

[75] Inventors: Henry Sauer, Menomonee Falls; Howard S. Sand, New Berlin, both of Wis.

[73] Assignee: Jos. Schlitz Brewing Company, Milwaukee, Wis.

[21] Appl. No.: 848,491

[22] Filed: Nov. 4, 1977

[51] Int. Cl.² ............................................. B07C 5/12
[52] U.S. Cl. .................................. 209/643; 209/645; 209/940; 198/380; 198/398
[58] Field of Search ................. 209/74 R, 80, 82, 121; 198/380, 381, 398; 73/45.3

[56] References Cited

U.S. PATENT DOCUMENTS

| | | | |
|---|---|---|---|
| 2,106,407 | 1/1938 | Hensley | 73/45.3 |
| 2,432,871 | 12/1947 | Fedorchak et al. | 73/45.3 |
| 3,374,887 | 3/1968 | Paruolo et al. | 209/80 X |
| 3,400,815 | 9/1968 | Bell et al. | 209/74 R X |
| 3,762,213 | 10/1973 | Nowicki | 73/45.3 |
| 3,824,840 | 7/1974 | Amberg | 73/45.3 |
| 3,869,042 | 3/1975 | Floyd et al. | 198/380 |

Primary Examiner—Allen N. Knowles
Attorney, Agent, or Firm—Andrus, Sceales, Starke & Sawall

[57] ABSTRACT

A conveying system incorporating an apparatus for detecting and rejecting downed and damaged containers, such as open ended cans. The conveying system includes a pair of endless belt conveyors which are spaced apart longitudinally and are adapted to convey cans in an upright condition. The upright cans are adapted to be transferred between the conveyors by a vacuum transfer mechanism which is located above the adjacent ends of the conveyors, the transfer mechanism includes an endless perforated belt that travels across the open bottom of a housing which is divided into a series of chambers. The chambers are subjected to a vacuum which acts to hold the upright cans against the perforated belt so that the cans can be transferred by movement of the belt from one conveyor to the other, while downed cans are ejected from the conveyor system. A central chamber is subjected to a lesser vacuum than the remaining chambers, and as the cans move across the central chamber, cans with damaged upper flanges will fall from the belt to a collection site.

16 Claims, 3 Drawing Figures

APPARATUS FOR DETECTING AND REJECTING DOWNED AND DAMAGED CONTAINERS

BACKGROUND OF THE INVENTION

Metal cans are transported to a brewery on pallets which contain superimposed layers or tiers of the empty open-topped cans. The layers of cans are mechanically unloaded from the pallet onto a conveyor system which conveys the cans to the filling machine. As the layers of cans are swept from the pallet onto the conveyor, cans may be tipped or downed, and if a downed can is not removed prior to filling, it can create a jam-up in the filling machine which makes it necessary to stop the entire conveying system and manually remove the jammed can.

In the past, vacuum devices have been used to automatically detect and reject downed cans. With devices of this type, a vacuum is applied to the open upper end of upright cans to hold the cans against a moving conveyor, while the downed cans will not be held against the vacuum mechanism and are rejected to a collection location.

Recently there has been increased use in aluminum cans in the brewing industry. Because of the light weight of the aluminum cans, the cans are more susceptible to denting, distortion, or other damage. If a can is dented, the upper flange of the can may not be planar which can cause jamming in the filling machine, or if the can is capped, it can cause a potential leakage problem. Furthermore, dented cans have an unattractive appearance to the consumer. As the cans are travelling in mass at high speed on the conveyor, it is extremely difficult to visually detect slightly damaged cans and to remove the cans from the conveyor.

SUMMARY OF THE INVENTION

The invention is directed to a conveying system including a mechanism for detecting and rejecting downed and damaged cans. The conveying system includes a pair of endless belt conveyors which are spaced apart in a longitudinal direction and are adapted to convey a single line or a mass of cans in an upright condition.

The apparatus for detecting and rejecting downed or damaged cans comprises a transfer mechanism which is located above the adjacent ends of the conveyors. The transfer mechanism includes an endless perforated belt which travels over the open bottom end of a housing or enclosure that is divided into a series of compartments or chambers by transverse walls. A vacuum is drawn on each of the compartments, and the vacuum acts to hold the upper ends of the upright cans against the perforated moving belt so that the upright cans can be transferred from the upstream conveyor to the downstream conveyor. Any downed cans will not be held against the perforated belt, and will be discharged from the upstream conveyor to a collection site.

In accordance with a feature of the invention, one of the chambers, preferably a central chamber, is subjected to a lesser, controlled vacuum than the remaining chambers. As the cans move across that chamber, the lesser vacuum will be unable to hold the cans against the belt if the upper flange of the can is distorted, due to damage or denting of the side wall. Thus, any damaged cans will be dropped from the transfer belt as the cans pass across that chamber.

The apparatus of the invention is capable of detecting and rejecting damaged cans as well as downed cans, thereby preventing possible jams-ups at the filling machine.

The transfer mechanism can be installed in high speed conveyor lines which are used to convey either a mass of cans or a single line of cans.

The magnitude of the vacuum in the central chamber is automatically controlled so that a vacuum of constant magnitude is applied at all times regardless of the number of cans that are exposed to the chamber.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
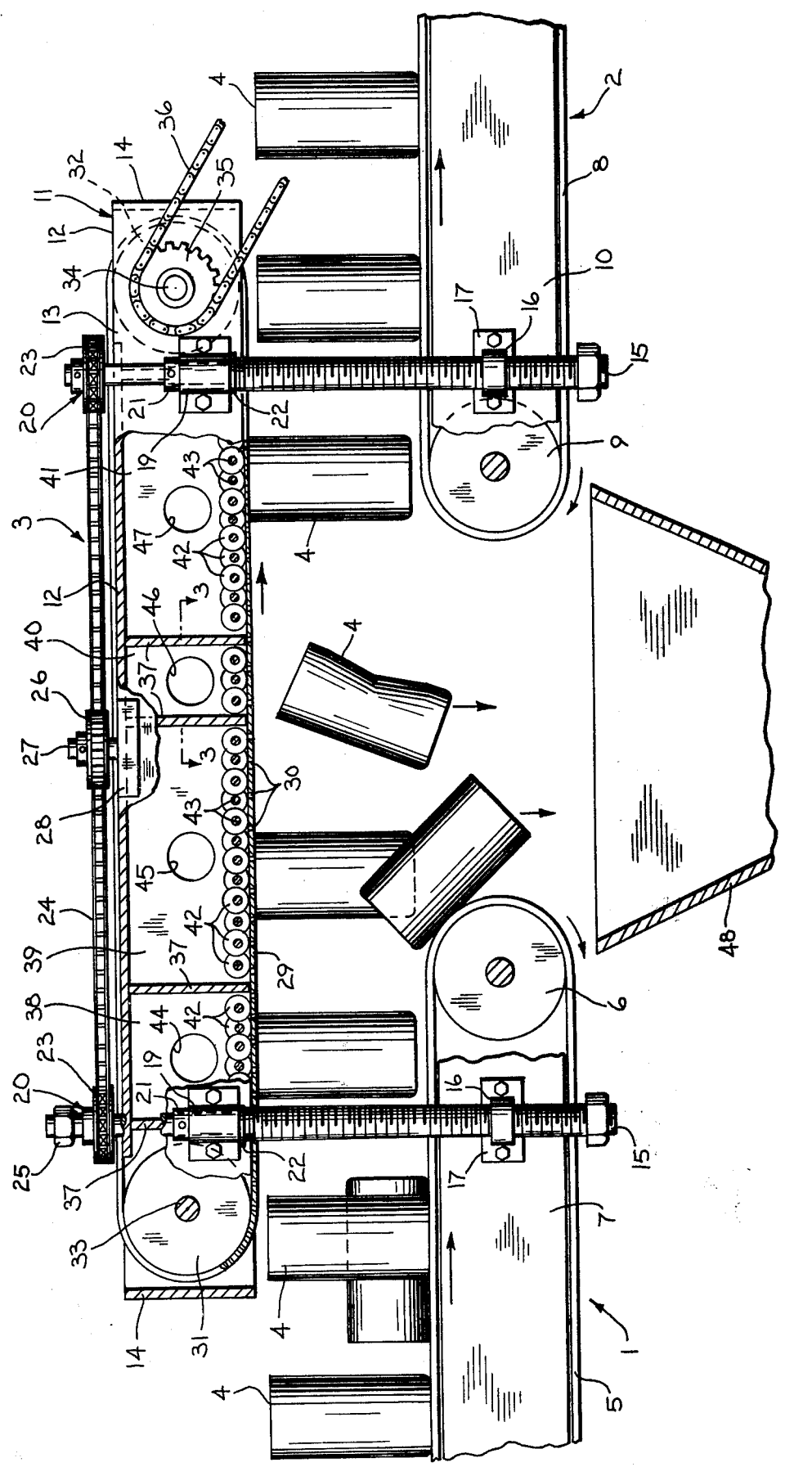
FIG. 1 is a side elevation of the apparatus of the invention with parts broken away in section.

The drawings illustrate a conveying system having particular use for conveying lightweight aluminum cans. The conveying system includes an upstream conveyor 1 and a downstream conveyor 2 which are spaced apart in the direction of travel of the conveyors. A transfer mechanism 3 is located above the adjacent ends of the conveyors 1 and 2 and serves to transfer a mass of upright cans 4 from the conveyor 1 to the downstream conveyor 2, while detecting and rejecting downed or damaged cans.

The conveyor 1 is a conventional link belt conveyor including an endless link belt 5 which travels over a plurality of rolls 6, only one of which is shown in FIG. 6. One of the rolls 6 can be driven in a conventional manner to move the belt 5 in the endless path. The shafts of the roll 6 are journalled within the conveyor frame 7.

The downstream conveyor 2 is similar in construction to conveyor 1 and includes an endless link belt 8 which is supported by rolls 9, the shafts of which are journalled within the conveyor frame 10.

The transfer mechanism 3 includes a box-like enclosure or housing 11, including a top wall 12, a pair of side-walls 13, a pair of end walls 14 and an open bottom.

The transfer mechanism is supported from the conveyors 1 and 2 by a series of jacks 15. Each of the jacks 15 is threaded within a nut 16 attached to bracket 17 on the frames 7 and 10 of the respective conveyors 1 and 2, while the upper end of each jack is journalled within a collar 19 that is attached to the side walls 13 of the transfer mechanism. To prevent axial movement of the jack 15 with respect to the collar 19, the upper portion 20 of the jack 15 is provided with a reduced diameter and a set collar 21 and thrust bearing 22 are secured to the jack on either side of the collar.

The jacks 15 can be adjusted in unison to thereby raise and lower the transfer mechanism with respect to the conveyors 1 and 2. In this regard, the upper end of each jack 15 carries a sprocket 23 and the sprockets are connected by a chain 24. In addition, a tightening sprocket 26, which is carried by shaft 27 journalled on bracket 28, is also engaged with the chain 24. To adjust the height of the transfer mechanism 3, a nut 25 is secured to the upper end of one of the jacks 15, and by rotating the nut, the corresponding sprocket 23 will be rotated to drive the chain 24 and thereby thread the jacks 15 within the respective nuts 16 to raise and lower the transfer mechanism with respect to conveyors 1 and 2.

The transfer mechanism 3 includes a perforated endless belt 29 having a plurality of holes 30 which is mounted for movement on an idler roll 31 and a drive roll 32. The shaft 33 of idler roll 31 is jouranlled within the side walls 13 of housing 11, and similarly the shaft 34 of drive roll 32 is journalled within the side walls 13 and one end of the shaft 34 carries a sprocket 35 which is engaged with drive chain 36. The chain 36 can be driven by a suitable motor, not shown, and it is contemplated that the drive for one of the conveyors 1 and 2 can be utilized to drive the perforated belt 29, so that the transfer mechanism will be driven at the same speed as the conveyors.

Figure 2:
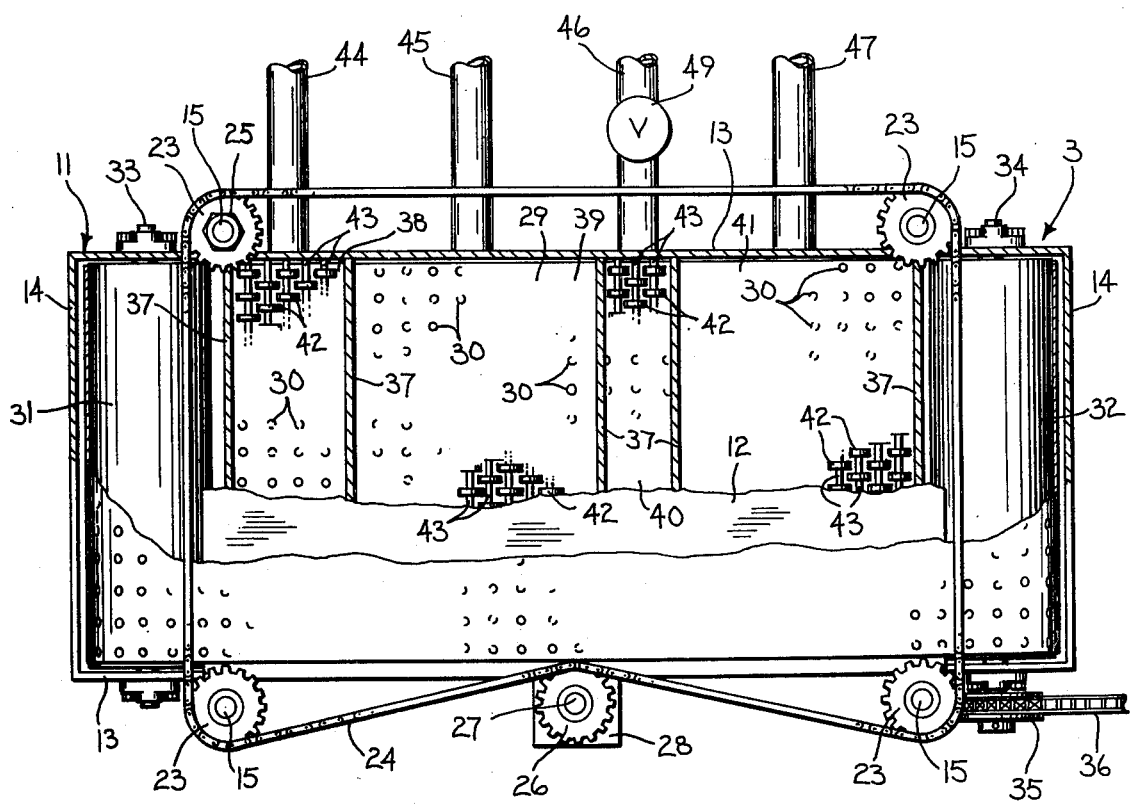
FIG. 2 is a top view of the transfer mechanism with parts broken away in section.

A series of transverse walls 37 extend across the housing 11 and divide the housing into a plurality of internal chambers 38–41. The chambers 38–41 have open bottoms and the belt 29 moves across the open ends of the chambers and is supported in travel by a plurality of small rollers 42 which are mounted on shafts 43, the ends of which are journalled in said side walls 13. As best shown in FIG. 2, the rollers 42 on adjacent shafts 43 are staggered so that the rollers partially overlap to provide an increased supporting surface for the belt 29, yet provide ample clearance to expose the holes 30 in belt 29.

The chambers 38–41 are subjected to a vacuum or sub-atmospheric pressure by connecting the chambers through lines 44–47 to the suction side of a pneumatic blower. The vacuum or sub-atmospheric pressure in the chambers will serve to draw the upper ends of the cans 4, which are located on the downstream end of conveyor 1, against the lower surface of the belt 29, so that the cans will then be transported by the belt 29 to a position over the end of the conveyor 2.

Any downed cans which are being conveyed on the conveyor 1 will not be drawn against the belt 29 and the downed cans will fall, as shown in FIG. 1, from the end of the belt 5 into a suitable receptacle or container 48.

In the preferred construction, the upstream chamber 38 has a smaller volume than the chambers 39 and 41, and as all three chambers 38, 39 and 41 are connected to the suction side of the blower, the chamber 38 will be subjected to a greater vacuum which acts to initially draw the cans upwardly off of the belt 5 and against the belt 29.

Figure 3:
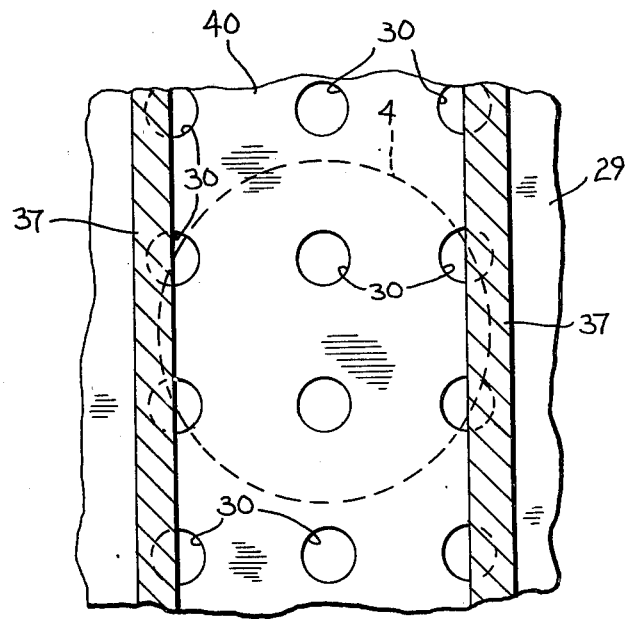
FIG. 3 is an enlarged section taken along line 3—3 of FIG. 1.

Chamber 40 serves to detect and reject dented or damaged cans. As shown in FIG. 3, the chamber 40 has a dimension, in the direction of travel of belt 29, slightly less than the diameter of a can, and a pressure regulating valve mechanism 49 is connected in the line 46 and serves to maintain a constant sub-atmospheric pressure in the chamber 40. The magnitude of the vacuum in chamber 40 is designed to be less than in chambers 38, 39 and 41 and the pressure regulating valve mechanism 49 serves to maintain a constant or uniform vacuum within chamber 40 regardless of the number of cans that are exposed to the chamber 40. Thus, the vacuum in chamber 40 when there are no cans exposed to the chamber will be the same as the vacuum in the chamber when there are a number of cans exposed to chamber 40.

If the lightweight aluminum cans are dented, distorted, or otherwise damaged, the upper flange or edge of the can will not be truly planar, with the result that the lesser vacuum in chamber 40 will not be capable of holding the can against the belt 29, and the can will fall and be collected within the receptacle 48. With the construction of the invention, the greater vacuum in chambers 38, 39 and 41, will draw even damaged cans upwardly into contact with the belt 29, but as the cans pass beneath the chamber 40, the lesser vacuum in chamber 40 will not be sufficient to hold the cans, with the result that the damaged cans will be released from the belt 29 and fall downwardly.

The jacks 15 are utilized to provide the desired vertical spacing between the conveyors 1 and 2 and the lower path of travel of belt 29. For most operations, the belt 29 is spaced about $\frac{1}{8}$ inch above the upper edge of the upright cans 4 on the conveyor 1. The jacks 15 are also utilized to change the vertical spacing when the conveyor system operates with cans of different heights.

The apparatus of the invention is capable of not only detecting and rejecting downed cans, but also will detect and reject damaged or distorted cans. By rejecting the downed and damaged cans, jamming of the cans in the filling machine is eliminated, thereby insuring continuous operation of the filling machine.

The apparatus of the invention is capable of operating in conjunction with high speed conveyor lines and can be used to transfer a mass of cans or a single line of cans.

Various modes of carrying out the invention are contemplated as being within the scope of the following claims particularly pointing out and distinctly claiming the subject matter which is regarded as the invention.

We claim:

1. A conveying system for detecting and rejecting downed and damaged containers, comprising first conveyor means for conveying a plurality of open ended containers in an upright position, second conveyor means for conveying said containers in an upright position, the downstream end of the first conveyor means being spaced from the upstream end of the second conveyor means, a transfer mechanism disposed above said ends of said first and second conveyor means for transferring upright containers from the first conveyor means to the second conveyor means, said transfer mechanism including a perforated transfer conveyor mounted for travel in a direction from said first conveyor means to said second conveyor means, a housing having an open bottom, said transfer conveyor disposed to travel across the open bottom of said housing, said housing defining a first chamber and a second chamber, vacuum means connected to said first and second chambers for drawing a vacuum in said chambers, said vacuum acting to draw the containers on the downstream end of said first conveyor means against said perforated transfer conveyor whereby said containers are conveyed to the upstream end of said second conveyor and deposited thereon, any downed containers on said first conveyor means being discharged from the downstream end of said first conveyor means, and means for maintaining a lesser vacuum in said second chamber than in said first chamber, whereby damaged containers passing across said second chamber on said transfer conveyor will be released from said transfer conveyor.

2. The conveyor system of claim 1, wherein said housing also includes a third chamber, said second chamber being located between said first and third chambers, said vacuum means also being connected to said third chamber to draw a vacuum therein.

3. The conveyor system of claim 1, wherein said means for maintaining a lesser vacuum in said second chamber comprises control valve means.

4. The conveyor system of claim 1, wherein said transfer conveyor is an endless belt.

5. The conveyor system of claim 1, wherein said vacuum means comprises a pneumatic blower, and a vacuum line connecting the suction side of said blower with said first and second chambers.

6. The conveying system of claim 1, and including a plurality of transverse walls in said housing dividing said housing into said first and second chambers.

7. The conveyor system of claim 4, and including a plurality of rollers mounted for rotation within the housing adjacent the open bottom thereof, said rollers being mounted on shafts extending transversely to the direction of movement of said belt, said belt travelling in contact with said rollers.

8. The conveyor system of claim 7, and including a plurality of transverse shafts with each shaft carrying a plurality of said rollers, the rollers on one shaft partially overlapping the rollers on adjacent shafts in a longitudinal direction.

9. The conveyor system of claim 1, and including adjusting means for adjusting the vertical position of said transfer mechanism with respect to said first and second conveyor means.

10. The conveying system of claim 1, wherein the first and second conveyor means are longitudinally aligned and travel in the same direction.

11. A conveying system for detecting and rejecting downed and damaged containers, comprising first conveyor means for conveying a plurality of open ended containers in an upright position, second conveyor means for conveying said containers in an upright position, the downstream end of the first conveyor means being spaced from the upstream end of the second conveyor means, a transfer mechanism disposed above said ends of said first and second conveyor means for transferring upright containers from the first conveyor means to the second conveyor means, said transfer mechanism including a perforated endless belt mounted for travel in a direction from said first conveyor means to said second conveyor means, a housing having an open bottom, said belt disposed to travel across said open bottom, roller support means disposed within the housing for supporting the belt as it travels across said open bottom, said housing defining an upstream chamber disposed above the downstream end of said first conveyor means and a downstream chamber, vacuum means connected to said chambers for drawing a vacuum therein, said vacuum in said upstream chamber acting to draw the containers on the downstream end of said first conveyor means against said belt whereby said containers are conveyed to the upstream end of said second conveyor and deposited thereon, any downed containers on said first conveyor means being discharged from the downstream end of said first conveyor means, and means for maintaining a lesser vacuum in said downstream chamber than in said upstream chamber, whereby damaged containers passing across said downstream chamber will be released from said belt.

12. The conveyor system of claim 11, and including means for regulating the intensity of the vacuum in said downstream chamber so that a uniform vacuum is maintained in said downstream chamber regardless of the number of containers exposed to said downstream chamber.

13. The conveying system of claim 11, wherein the dimension of said downstream chamber in the direction of travel of said belt is less than the diameter of a container.

14. The conveyor system of claim 11, and including adjusting means for adjusting the vertical position of said transfer mechanism with respect to said first and second conveyor means.

15. The conveyor system of claim 14, wherein said adjusting means comprises a plurality of jacks interconnecting the first and second conveyor means and the corresponding ends of the transfer mechanism.

16. The conveying system of claim 11, wherein said housing also includes a third chamber, said second chamber being located between said first and third chambers, said vacuum means also being connected to said third chamber to draw a vacuum therein.

* * * * *